May 10, 1949.     W. R. TIPPETT     2,469,617
VALVE FOR WATERING TROUGHS
Filed April 16, 1945     2 Sheets-Sheet 1

WILLIAM R. TIPPETT
Inventor

By  *[signature]*
Attorney

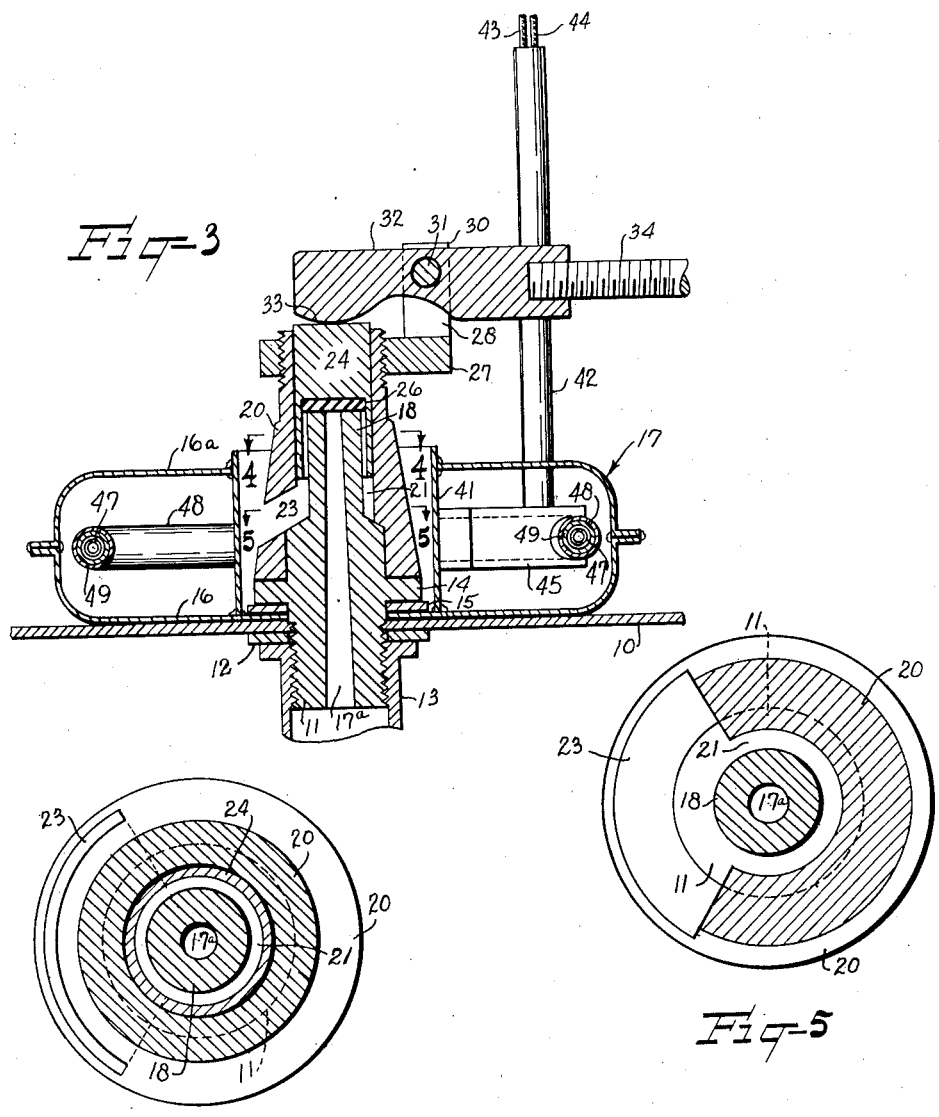

Patented May 10, 1949

2,469,617

UNITED STATES PATENT OFFICE 2,469,617

VALVE FOR WATERING TROUGHS

William R. Tippett, near Greensboro, N. C., assignor of one-half to R. B. Dunn, Greensboro, N. C.

Application April 16, 1945, Serial No. 588,662

1 Claim. (Cl. 137—104)

This invention relates to a watering trough of the type used for watering poultry, livestock, and the like and more especially for automatically controlling the inflow of the water into the trough together with means for heating the inflow valve so as to prevent its freezing at any time. Watering troughs for poultry, livestock and the like are usually outdoors and subjected to low temperatures in winter and it is an object of this invention to not only provide anti-splash means for admitting water into the trough, which means are float-controlled to maintain a constant level within the trough, but also means are provided for heating the space around the inflow valve so as to prevent its freezing at any time even in low temperatures.

It is an object of this invention to provide means for controlling the inflow of water into a watering trough and surrounding said means with a special device for preventing the freezing of the valve during cold weather.

It is another object of this invention to provide a float controlled inlet valve for a watering trough in which the valve has an outlet portion directed downwardly and an annular member surrounding the valve to prevent splashing of the water upwardly as it flows out of the valve, together with means for heating the space surrounding the valve to prevent freezing of the working parts of the valve during extremely cold weather.

Some of the objects of the invention having been stated, other objects will appear as the description proceeds when taken in connection with the accompanying drawings in which:

Figure 3 is a longitudinal sectional view taken substantially along the line 3—3 in Figure 2;

Figure 4 is a cross sectional view taken along the line 4—4 in Figure 3;

Figure 5 is a cross sectional view taken along the line 5—5 in Figure 3.

Figure 1:
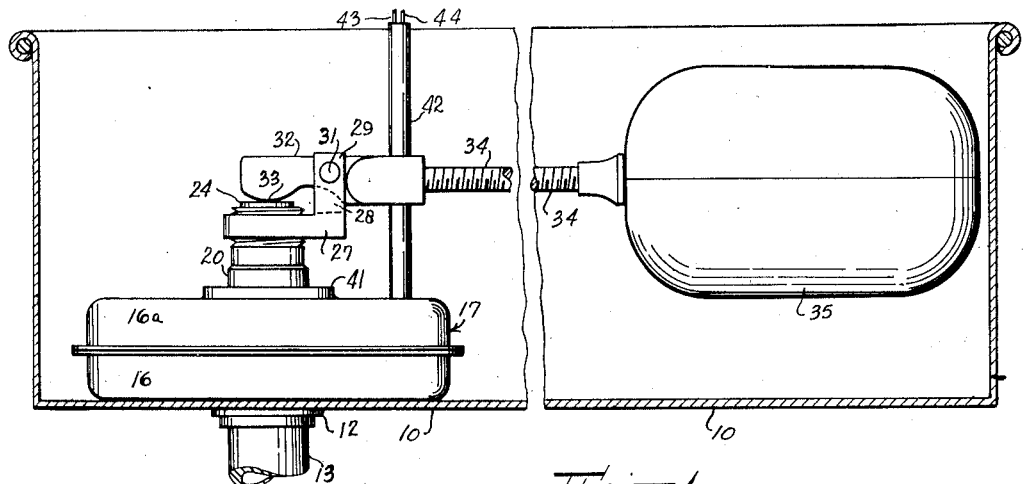
Figure 1 is an elevation of the apparatus showing it attached to a trough and with a portion of the trough being broken away.
Figure 2:
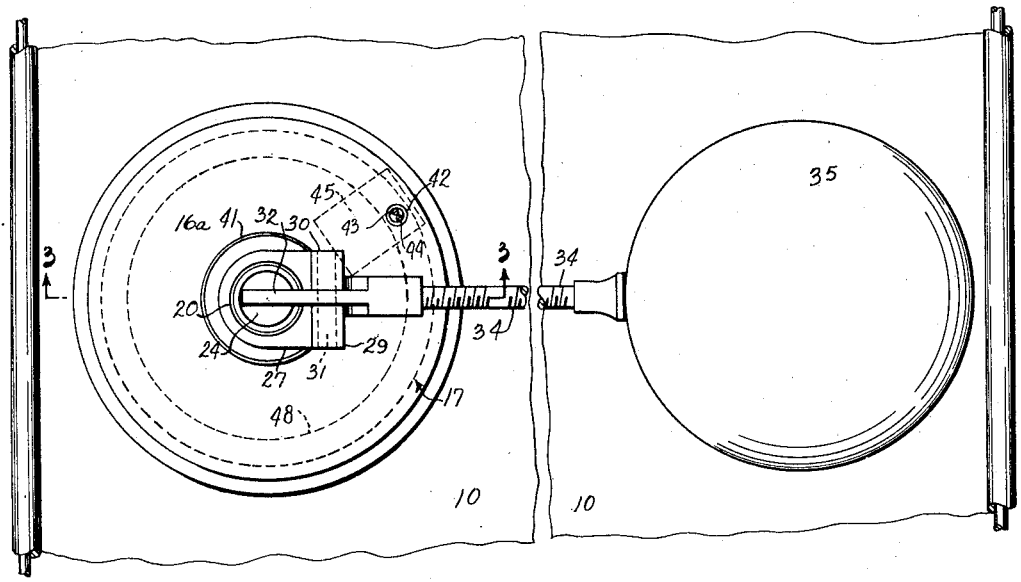
Figure 2 is a top plan view of the apparatus and showing portions of a trough in which it is mounted.

Referring more specifically to the drawings the numeral 10 indicates a suitable trough in which the special inlet valve is adapted to be mounted. This inlet valve comprises a main portion 11 which is adapted to penetrate a suitable hole in the bottom of tank 10 and the lower end of this main portion 11 is threaded and is adapted to have secured therearound a washer 12 and a suitable inlet pipe 13 threadably secured around the lower portion of member 11 to press the washer 12 against the bottom of the tank 10. Water flows into the tank through the pipe 13. This main portion 11 has a shoulder 14 which is adapted to press against a washer 15 disposed on the top portion of the lower shell portion 16 of a housing 17. This portion 16 has an opening through which the member 11 is adapted to project. When the pipe 13 is screwed on, the shoulder 14 will press the bottom portion 16 against the bottom of the tank 10 and therefore washers 12 and 14 will provide a watertight seal in the bottom of the trough.

The main portion 11 has a passageway 17a through which water may flow into the tank. This main portion 11 has an upper restricted stem 18 through which the passageway 17a also extends. Secured to the upper portion of shoulder 14 and around the member 11 is a sleeve 20 which provides an annular space 21 surrounding the stem 18.

There is provided in one side of the sleeve 20 an opening 23 through which the water passing upwardly through passageway 17a may flow outwardly into the trough. The space 21 between the sleeve 20 and the portion 18 is adapted to receive a cap 24 which is slidably mounted in the upper end of the sleeve 20. Cap 24 has a central hole somewhat larger than the dimensions of the portion 18 which slidably fits over the portion 18 and the bottom of this cavity has a washer 26 fitting over the upper end of passageway 17a. The upper end of sleeve 20 is threaded, and threadably secured thereon is an L-shaped bracket 27 which has a slot 28 therein providing a couple of upstanding portions 29 and 30 and transversely penetrating the slot 28 and the projections 29 and 30 is a pin 31 which penetrates a pivoted member 32 having a cam surface 33 which is adapted to slidably engage the upper surface of cap 24. The member 32 has secured at its right hand end a float rod 34 and on the other end is mounted a conventional float 35.

Bottom portion 16 of a shell 17 already described, is firmly secured to the bottom of the tank 10 by washers 12 and 15 and pipe 13. This bottom portion 16 of housing 17 has welded or otherwise secured thereto an upper portion 16a. An annular member 41 is welded or otherwise secured centrally of the housing 17 and provides a well in which the valve parts above described are adapted to be housed. This annular well portion 41 prevents splashing of the water when it pours into an empty trough as the water will very soon fill the annular member 41 and flow out over its top into the trough. This housing 17 is adapted to have secured thereto by welding, brazing or the like, a suitable pipe 42 through which a pair of wires 43 and 44 lead to a suitable conventional thermostatic switch housing 45, and from this thermostatic switch housing 45, a conventional electrical heating coil 47 is led, one end of wire heating coil 47 being secured to one wire 43 and the other end being secured to the other wire 44 through the conventional thermostatic switch mechanism within the housing 45. The heating coil 47 is disposed in a pipe 48, which has electrical insulation 49 over its interior surface to prevent a short circuiting of the heating coil 47. The ends of the pipe 48 are joined to the housing 47 which houses the conventional thermostatic switch. The pipe 42 not only is brazed or otherwise secured to the upper portion 16a of the housing 17 but extends therethrough and is suitably secured to the housing 45 which houses the thermostatic switch mechanism therein.

It is thus seen that the pressure of the inflowing water through passageway 17 will lift the cap 24 upwardly and water will flow downwardly through the annular space 21 and out through opening 23 where it will soon fill the annular member 41 and flow outwardly over the housing 17 and down in the trough until the desired water level is reached, at which time the float 35 will push cap 24 downwardly to seal the passageway 17a against further admission of water until the water level within the trough is lowered by consumption by animals for which it is designed. The heating coil 47 within the housing 17 will heat the air within the housing 17 and it will transmit the heat into and through the water disposed within the annular well 41 and will thus keep the valve mechanism heated at all times and prevent its freezing and thus insuring its free operation at all times.

In the drawings and specification there has been set forth a preferred embodiment of the invention, and although specific terms are employed, they are used in a generic and descriptive sense only, and not for purposes of limitation, the scope of the invention being defined in the claim.

I claim:

In a watering trough having an inlet opening, an inlet valve adapted to be mounted in said opening, said inlet valve comprising a central member provided with a threaded lower portion having a shoulder adjacent thereto and adapted to penetrate said opening in the trough, an annular housing having a bottom portion extending beneath the shoulder portion and in close proximity to the inlet portion and adapted to rest on the bottom of the trough, the lower end of the central member having an inlet pipe threadably secured thereto to secure the central member in position over the opening and to secure the annular housing in position around the valve, said central member having a passageway extending therethrough, a shell secured to the central member and surrounding the upper end of the central member and providing an annular space between the interior of the shell and the upper end of the central member, a cap slidably mounted in the upper end of the shell and surrounding the upper end of the central member, the shell having an opening in one side thereof communicating the annular space between the shell and the upper end of the central member, an L-shaped member threadably secured on the upper end of the shell and having a vertically extending portion provided with a slot, a pin mounted in the vertically extending portion of the L-shaped member and traversing said slot, a lever pivotally mounted intermediate its ends on said pin, one end of the lever slidably engaging the upper end of said cap and a float member mounted on the other end of the lever.

WILLIAM R. TIPPETT.

REFERENCES CITED

The following references are of record in the file of this patent:

UNITED STATES PATENTS

| Number | Name | Date |
|---|---|---|
| 945,569 | Miller | Jan. 4, 1910 |
| 1,246,786 | Rodney | Nov. 13, 1917 |
| 2,015,024 | Yarnall | Sept. 17, 1935 |
| 2,046,792 | Schmiedeknecht | July 7, 1936 |
| 2,228,315 | Hutton | Jan. 14, 1941 |

FOREIGN PATENTS

| Number | Country | Date |
|---|---|---|
| 496,950 | Great Britain | Dec. 8, 1938 |